United States Patent
Quittner et al.

(10) Patent No.: US 12,442,141 B2
(45) Date of Patent: Oct. 14, 2025

(54) METHOD AND DEVICE FOR CONTROLLING/REGULATING A ROTATORY DRIVE OF A WORKING UNIT OF A TRACK MAINTENANCE MACHINE

(71) Applicant: Plasser & Theurer Export von Bahnbaumaschinen Gesellschaft m.b.H., Vienna (AT)

(72) Inventors: Markus Quittner, Linz (AT); Harald Daxberger, Linz (AT); Reinhard Boeck, Aschach an der Donau (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 966 days.

(21) Appl. No.: 17/613,590

(22) PCT Filed: Apr. 23, 2020

(86) PCT No.: PCT/EP2020/061269
§ 371 (c)(1),
(2) Date: Nov. 23, 2021

(87) PCT Pub. No.: WO2020/233933
PCT Pub. Date: Nov. 26, 2020

(65) Prior Publication Data
US 2022/0235521 A1   Jul. 28, 2022

(30) Foreign Application Priority Data
May 23, 2019 (AT) .................................. A 193/2019

(51) Int. Cl.
*E01B 35/00* (2006.01)
*G01H 3/04* (2006.01)
(Continued)

(52) U.S. Cl.
CPC ................ *E01B 35/00* (2013.01); *G01H 3/04* (2013.01); *G01H 3/06* (2013.01); *G05B 19/042* (2013.01);
(Continued)

(58) Field of Classification Search
CPC .......... E01B 27/12; E01B 27/13; E01B 27/14; E01B 27/16; E01B 27/17; E01B 27/18;
(Continued)

(56) References Cited

U.S. PATENT DOCUMENTS

| 9,031,804 B2 * | 5/2015 | Korajda | G01D 18/001 |
| | | | 702/89 |
| 2002/0078853 A1 * | 6/2002 | Holmes | E01B 27/00 |
| | | | 104/2 |

(Continued)

FOREIGN PATENT DOCUMENTS

| FI | 20175454 A1 * | 11/2018 | ............. E01B 27/20 |
| WO | 2008009314 A1 | 1/2008 | |

(Continued)

OTHER PUBLICATIONS

Hauke R. et al., Ballast Cleaning machines—an overview, EI track construction machines and devices, May 2016, pp. 30-35, English summer on p. 35.

*Primary Examiner* — S. Joseph Morano
*Assistant Examiner* — Heaven R Buffington
(74) *Attorney, Agent, or Firm* — Laurence A. Greenberg; Werner H. Stemer; Ralph E. Locher (57) ABSTRACT

A method for controlling/regulating a rotatory drive of a working unit of a track maintenance machine includes using a sensor to record a measurement parameter with an approximately periodic history function derived from a rotation of the drive. A frequency or period duration of the history function is determined with an evaluation device, (Continued)

and the frequency or period duration is compared with a target parameter for stipulating a control signal. A number of time-discrete measurement values is formed for the measurement parameter and an auto-correlation of these measurement values is carried out by a calculation unit for determining the frequency or the period duration. As compared to a conventional method with zero stage recording, a precise recording of frequency changes is therefore also possible between two zero stages. A device for carrying out the method is also provided.

15 Claims, 5 Drawing Sheets (51) Int. Cl.
*G01H 3/06* (2006.01)
*G05B 19/042* (2006.01)
*E01B 27/16* (2006.01)

(52) U.S. Cl.
CPC .... *E01B 27/16* (2013.01); *G05B 2219/24001* (2013.01)

(58) Field of Classification Search
CPC ........... E01B 27/20; G01B 7/00; G01B 17/00; G05B 19/042
USPC .................................. 104/10, 11, 12, 13, 14
See application file for complete search history.

(56) References Cited

U.S. PATENT DOCUMENTS

| | | | |
|---|---|---|---|
| 2002/0183947 A1 | 12/2002 | Ando et al. | |
| 2015/0255084 A1* | 9/2015 | Oda | G10L 21/0216 704/226 |
| 2017/0019012 A1* | 1/2017 | Sami | H02K 33/00 |
| 2019/0017226 A1 | 1/2019 | Auer et al. | |
| 2019/0055698 A1* | 2/2019 | Hofstaetter | E01B 27/13 |

FOREIGN PATENT DOCUMENTS

| | | | | |
|---|---|---|---|---|
| WO | 2017011775 A1 | 1/2017 | | |
| WO | WO-2017084733 A1 * | 5/2017 | ............. | B06B 1/162 |
| WO | 2018009173 A1 | 1/2018 | | |

* cited by examiner

METHOD AND DEVICE FOR CONTROLLING/REGULATING A ROTATORY DRIVE OF A WORKING UNIT OF A TRACK MAINTENANCE MACHINE

FIELD AND BACKGROUND OF THE INVENTION

The invention concerns a method for controlling/regulating a rotatory drive of a working unit of a track maintenance machine, wherein a measurement parameter with an approximately periodic history function deduced from a rotation of the drive is recorded by means of a sensor, wherein a frequency or period duration of the history function is determined with an evaluation means, and wherein the frequency or period duration is compared with a target value for stipulating a control signal. The invention further concerns a device for carrying out the method.

PRIOR ART

A method for the rotation speed regulation of a rotatory drive of a tamping unit is known from publication Auer F. et al.: High-Tech-Stopfaggregate für nachhaltige Gleislageverbesserung, EI-Eisenbahningenieur, November 2015, pages 18-22. An eccentric shaft is driven for generating vibration, which is transmitted to tamping tines via squeezing drives.

This offers the possibility of changing the vibration frequency during a tamping cycle in a targeted way. A higher frequency (42-50 Hz) is stipulated during a submersion process of the tamping tines into a ballast bed. During a squeezing process of the tamping tines the optimal frequency lies at 35 Hz. In the lifted condition a reduced idle frequency (approx. 28 Hz) is set, at which the unit runs most quietly.

Phase stabilisation is also known for a tamping machine with rotation speed regulation. For this, the rotation speeds of all vibration generators are synchronised when running idle and a respective phase offset of the rotating drives is set in such a way that vibration overlaps are minimised.

Rotatory vibration drives can also be used in other working units of track maintenance machines. WO 2008/009314 A1 for example discloses a so-called track stabiliser, where stabilisation units with rotating imbalances are caused to vibrate. Two synchronised stabilisation units are operated with an adjustable vibration frequency here.

Bedding cleaning machines with various sieve systems are also known from Hauke R. et al.: Bettungsreinigungsmaschinen—ein Überblick, EI-Gleisbaumaschinen undgeräte, May 2016, pages 30-35. These also use rotatory drives with an adjustable vibration frequency.

SUMMARY OF THE INVENTION

The invention is based on the object of improving a method of the type mentioned above in such a way that a precise determination of the frequency or period duration can be carried out with rapid change recording. It is a further object of the invention to provide a corresponding device for carrying out the improved method.

According to the invention, these objects are achieved by the features of the independent claims described below. Advantageous further developments of the invention are clear from the dependent claims.

For this, a number of time-discrete measurement values are formed for the measurement parameter and an auto-correlation of these measurement values is carried out by means of a calculation unit for determining the frequency or period duration. Compared to a conventional method with zero stage recording a precise recording of frequency changes between two zero stages is therefore also possible. Function values of an auto-correlation function can be determined at any time with the recorded time-discrete measurement values. The results of a corresponding function calculation are function values across a time axis. On the time axis, a time period between zero and a maximum, occurring first, states the period duration of the history function of the measurement parameter. This means that a new determination of the frequency is possible immediately with every newly recorded measurement value.

A further measurement parameter with an approximately periodic history function deduced from a rotation of a further drive is recorded in a further development of the invention by means of a further sensor, wherein a further number of time-discrete measurement values is formed for the further measurement values, and wherein a cross-correlation of the measurement values of both measurement parameters is carried out by means of the calculation unit for determining a phase offset. As the cross-correlation can be carried out at any time, a deviation of stipulated phase offsets becomes apparent immediately. This ensures a precise synchronisation of several rotatory drives (phase stabilisation).

A cycle time is advantageously stipulated for forming the time-discrete measurement values, wherein the cycle time determines an evaluation period. In this way an evaluation of the frequency or period duration, and possibly of the phase offset, is carried out with every newly recorded measurement value. The accuracy of the method increases with decreasing cycle times.

A further improvement envisages that an iterative calculation of function values of a correlation function takes place by forming a sum of a consistent number of measurement value products with every new measurement values. This limits the calculation effort and offers the possibility of further simplifications.

It is particularly meaningful here to subtract the measurement value product with the oldest measurement value from the sum of the measurement value products of the previous calculation for a current calculation of a function value, and to add a new measurement value product to the current measurement value. In this way only a few calculation operations are necessary to update the function values of the correlation function. The low calculation effort requirements means that the calculations can be carried out with a cost-effective and space-saving calculation unit almost in real time.

A further improvement envisages that interpolated measurement values are calculated prior to a calculation of function values of a correlation function. The interpolation of additional measurement values between the given subsequent values allows a more precise determination of the position of the maximum of the correlation function. In this way, the determination of the frequency or period duration can be carried out more precisely.

The quality of the frequency determination is increased further if the measurement values are filtered prior to a calculation of function values of a correlation function. Measurement signal preparation for example takes place by means of a so-called infinite impulse response filter (IIR band pass filter of the $4^{th}$ order). A high pass eliminates a steady component of the signal here, whilst a low pass dampens and removes high-frequency interference in the signal. IIR filters also have the advantage that they, unlike other digital filter types (for example FIR filters), carry out substantially fewer calculation operations. This feature is of great use here, as the requirements on the calculation capacity of the calculation unit are limited.

The method is also improved in that interpolated function values are calculated prior to a determination of a maximum of the correlation function. The interpolation is expediently interpolated only within the range around the extreme values to be able to determine the position of such extreme values more precisely. Increased accuracy can thus be realised with less calculation effort.

In one advantageous realisation of the invention, a distance of a sensitive element of the sensor from an eccentric shaft driven with the drive is recorded as a measurement parameter. Due to the error tolerance during frequency determination by means of the correlation function there is no need for a precise mounting of the sensor or a calibration process here. If the drive does drive an eccentric shaft made of a ferromagnetic material, an inductive distance sensor without additional adjustments of the rotating parts can be used.

An alternative realisation envisages that a field strength of a magnetic field rotated with the drive and acting on the sensor is recorded as a measurement parameter. For this, a driven shaft is magnetised or supplemented with a magnet to generate a rotating magnetic field. The additional space requirement is low even if a magnet is fitted. The field strength, which changes during a shaft rotation, is recorded by means of a suitable sensor near the shaft.

The device according to the invention for carrying out one of the described methods comprises a sensor for recording a measurement parameter deduced from a rotation of a drive with an approximately periodic history function, an evaluation means for determining a frequency or a period duration of the history function, and an assembly for the regulated control of the drive. A calculation unit is supplied with time-discrete measurement values of the measurement parameter for this, wherein an algorithm is set up in the calculation unit for carrying out an auto-correlation of these measurement values for determining the frequency or period duration. A precise frequency determination can therefore be carried out immediately with every newly recorded measurement value.

In an improved device, a further sensor for recording a further measurement parameter deduced from a rotation of a further drive is arranged, wherein the calculation unit is supplied with time-discrete measurement values of the further measurement parameter, and wherein an algorithm for carrying out a cross-correlation of the measurement values of both measurement parameters is set up in the in the calculation unit for determining a phase offset. A simple arrangement for phase stabilisation is therefore provided in this way.

It makes sense for realising the device with few and compact components if the calculation unit is a microprocessor. Optimised algorithms and an efficient implementation of the signal processing path are used here for adjusting the calculation capacity to the features of the features of the microprocessor complete with a limited working memory.

The calculation unit is advantageously arranged in a first assembly with a communication interface, wherein the drive has its own assembly, which comprises power electronics, a regulator and a communication interface, which is coupled with the first assembly. The separate assemblies allow a simple scaling of the device. The calculation unit can be used for the frequency or period duration determination of several drives in this way.

It is of advantage for the efficient recording of the measurement parameter if the sensor comprises a sensitive element for the capacitive or inductive or magnetic recording of the measurement parameter. No particular requirements exist for mounting the sensor, as neither offset nor the precise value of the amplitude of the sensor signal are relevant for further processing.

BRIEF DESCRIPTION OF THE FIGURES

The invention will now be explained by way of example with reference to the enclosed Figures. These show in schematic illustrations.

DETAILED DESCRIPTION OF THE INVENTION

Figure 1:
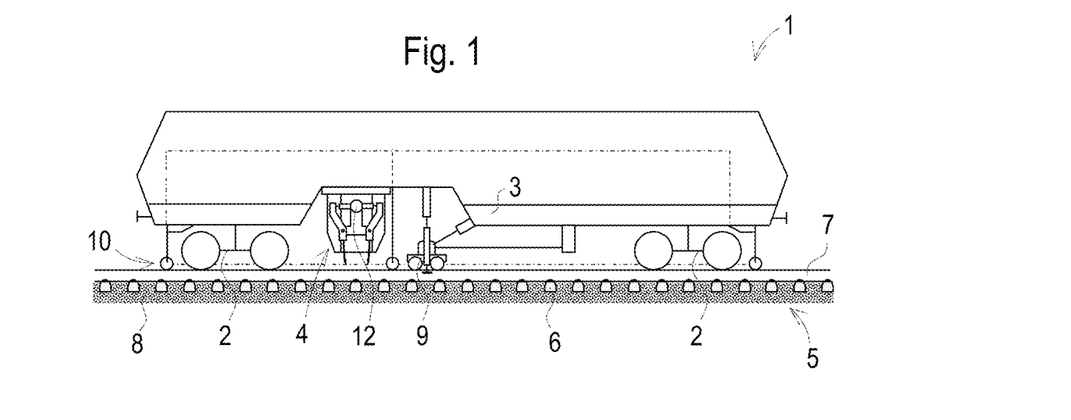
FIG. 1 track maintenance machine with tamping unit
FIG. 2 track maintenance machine with stabilisation unit
FIG. 3 tamping unit in a side view
FIG. 4 cross-section through track with tamping machine
FIG. 5 sensor with distance measurement
FIG. 6 sensor with field strength measurement
FIG. 7 measurement values
FIG. 8 correlation function
FIG. 9 forming of function terms
FIG. 10 system illustration
FIG. 11 system illustration with assemblies
FIG. 12 signal processing diagram

The track maintenance machine 1 illustrated in FIG. 1 is a tamping machine and comprises a machine frame 3 that is displaceable on on-track undercarriages 2. A tamping unit is arranged on the machine frame 3 as a working unit 4. The tamping machine serves for processing a track 5, where rails 7 fitted to sleepers 6 are positioned in a ballast bed 8. During the tamping process the track panel made of sleepers 6 and rails 7 is lifted into a target position by means of a lifting/lining unit 9 and a measuring system 10 and displaced sideways if required. Vibrating tamping tools 11 of the working unit 4 are submersed into the ballast bed 8 for fixing this position. The submersed tamping tools 11 are squeezed towards each other and compress the ballast below the lifted sleepers 6 here.

The tamping tools 11 are coupled with a vibration generator 12 for generating vibration. The vibration generator 12 comprises a rotatory drive 13, which drives an eccentric shaft 14. Squeezing drives 15 are mounted on the eccentric shaft 14. When the eccentric shaft 14 rotates, its eccentricity generates the desired vibration amplitude.

Figure 2:
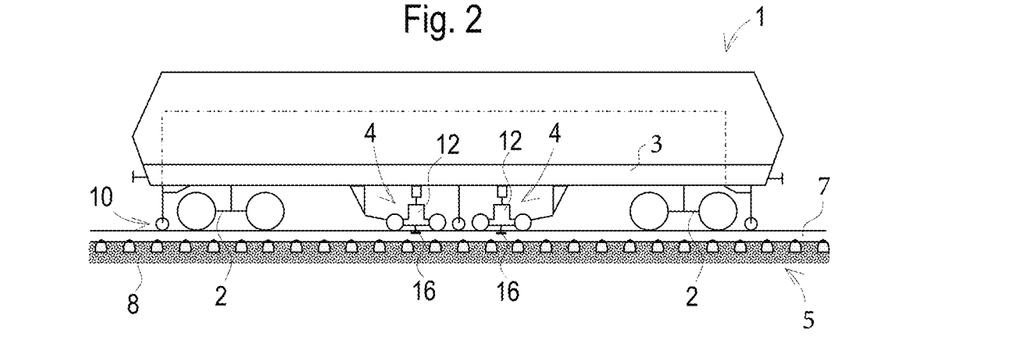

After a tamping process, the track 5 is normally stabilised to pre-empt settlement. The track maintenance machine 1 illustrated in FIG. 2 serves for this. This is a dynamic track stabiliser (DGS) with two stabilisation units as working units 4 here. Each stabilisation unit comprises a vibration generator 12 with rotating imbalances, which are driven by means of a rotatory drive 13. The active vibration generator 12 starts a vibration of the vibration unit transversely to the longitudinal track direction. The stabilisation unit straddles the rails 7 of the track 5 with roller tongs 16 here, which transmits the vibration to the track panel. This effects a shaking of the track panel into the ballast bed 8.

For tamping as well as for stabilisation as well as for further vibration generators 12 used in track construction, the vibration generated should fulfil different requirements. A vibration frequency of 35 Hz is for example stipulated for optimal ballast compression. A higher frequency f of approx. 45 Hz is desired for a submersion process of the tamping tools 11 in order to reduce submersion resistance. Outside of the ballast bed 8, the frequency f should be lower to reduce noise pollution.

Figure 3:
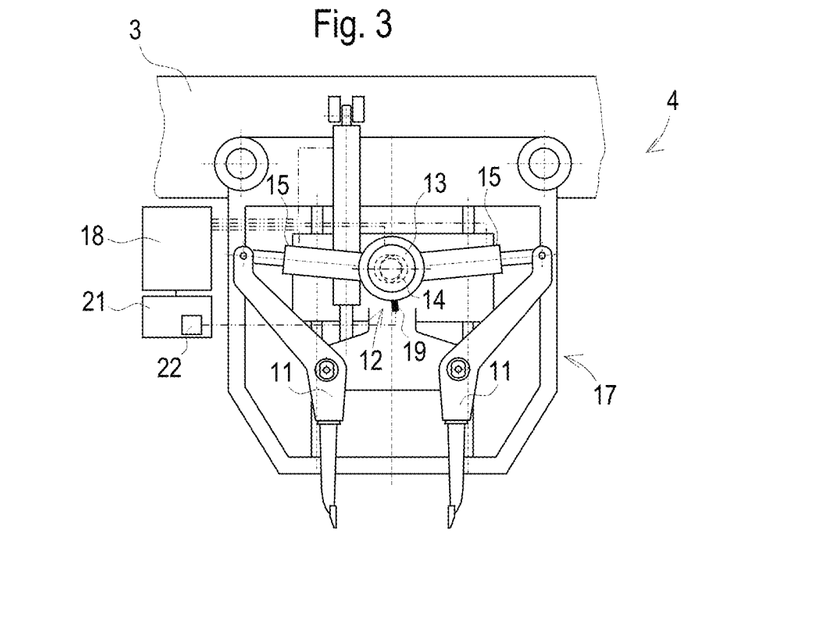
Figure 4:
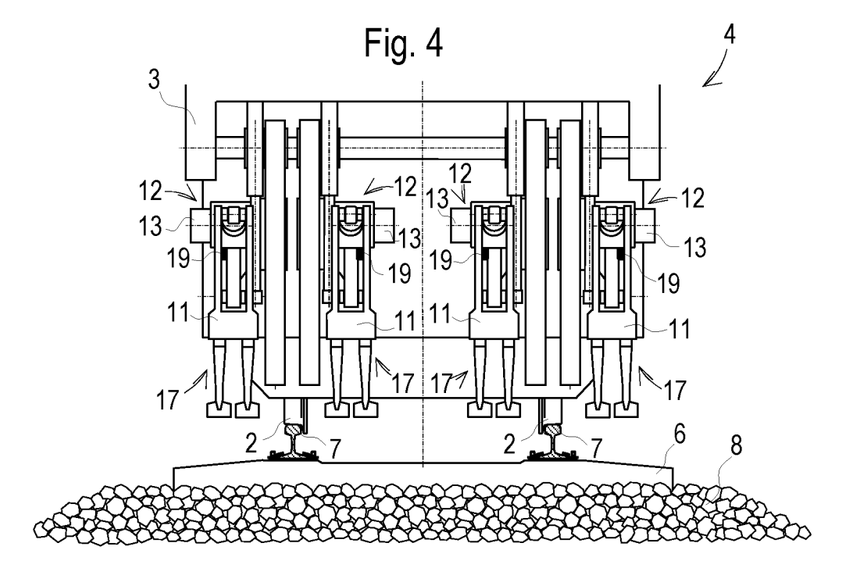

Further requirements are explained with reference to the working unit 4 in FIGS. 3 and 4. The working unit 4 comprises four tamping devices 17 which can be lowered into the ballast bed 8 separately from each other by means of a height adjustment drive. Opposing tamping tools 11 are coupled with their own vibration generator 12 via squeezing drives 15 on each tamping device 17. The vibration generators 12 are controlled via a common controller 18. Phase offsets φ are stipulated for the generated vibration in relation to each other in addition to the frequency f. A mirror-inverted synchronisation of the tamping devices is normally desired to minimise the reactive vibration acting on the machine frame 3 as well as noise development.

It is necessary for controlling/regulating a rotatory drive 13 in a vibration generator 12 to continuously record the frequencies f or the period duration T. High requirements also exist during track maintenance with regard to the robustness of a sensor arrangement. The evaluation of zero stages is known to have the disadvantage that frequency changes may be recognised late with the same. It is therefore envisaged according to the invention to determine the frequency f or the period duration T by means of auto-correlation. A measurement parameter X, which represents an approximately periodic function development of the generated vibration, remains the basis for this.

Figure 5:
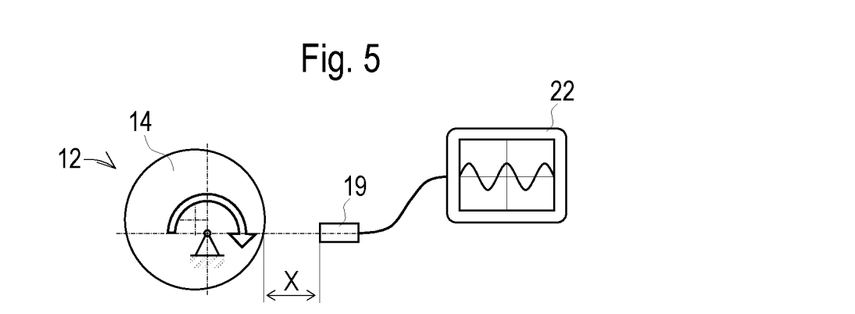

To that end, a sensor 19 that is magnetically, inductively or capacitively coupled with the vibration generator 12 is arranged. The distance sensor 19 illustrated in FIG. 5 for example comprises a sensitive element, which measures a distance to an eccentric sleeve surface of an eccentric shaft 14 via inductive coupling. This distance, which changes when the eccentric shaft 14 rotates, is the measurement parameter X, the approximately periodic development of which is subsequently evaluated.

Figure 6:
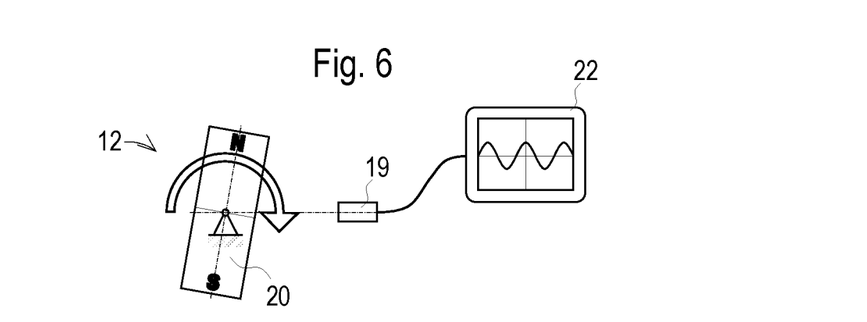

Alternatively to this a magnetic component 20 of a vibration generator 12 is arranged in FIG. 6, which is rotated by means of the rotatory drive 13. This creates a rotating magnetic field, which is recorded by means of a fixed sensor 19. With this variant the field strength changing during a rotation is recorded and evaluated as measurement parameter X.

Figure 7:
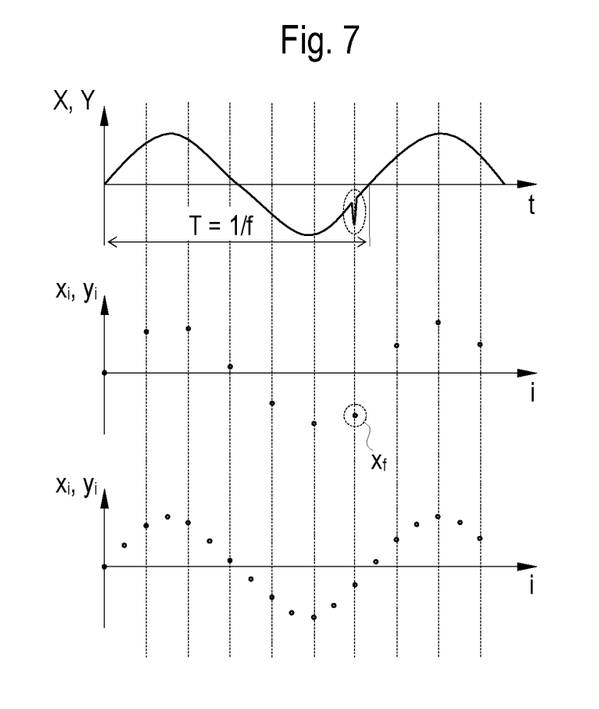

FIG. 7 shows an exemplary processing of the measurement parameter X (or Y for a further vibration generator 12). Measurement parameter development over time t is illustrated in the upper diagram. This is an approximately periodic history function, wherein interference may occur as a consequence of external influences. The aim of the following method steps is the determination of the period duration T or frequency f=1/T. Measurement values $x_i$ (or $y_i$ for a further vibration generator 12) are recorded in the second diagram for measurement parameter X, wherein the time interval between the measurement values $x_i$ is stipulated by a cycle time. For this, information is either requested from the sensor 19 in cycles, or a time-discrete number of measurement values $x_i$ is formed from an analogue sensor signal by means of an analogue digital transducer (serial values with index i).

Incorrect measurement values $x_f$ are advantageously recognised and eliminated by means of a digital filter. It is also expedient to improve the sensor signal by means of an IIR filter, for example of the fourth order. A high pass of the second order removes steady components here, whilst a low pass of the second order dampens high-frequency interference of the signal.

An interpolation of the measurement value development takes place during a next step to obtain an improved data basis for forming the auto-correlation function $\Psi_{xx}(i)$. An additional value is for example interpolated between each recorded measurement value $x_i$ ($3^{rd}$ diagram in FIG. 7).

Figure 8:
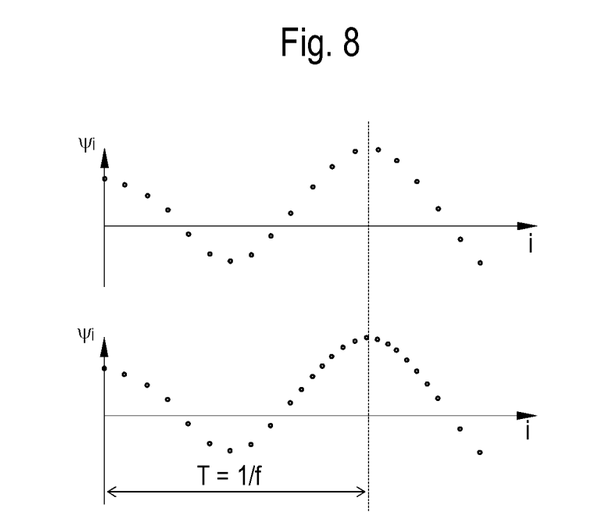

An example of the history function values $\Psi_i$ of the auto-correlation function $\Psi_{xx}(i)$ is illustrated in FIG. 8. The values $\Psi_i$ of the auto-correlation function $\Psi_{xx}(i)$ result from a totalling of measurement value products $x_n \cdot x_{n-i}$ as follows:

$$\Psi_{xx}(i) = \sum_n x_n \cdot x_{n-i}$$

It is expedient for the present invention if a consistently identical number of measurement value products is totalled for each function value An evaluation of frequency f or period duration T by means of a new calculation of the auto-correlation function $\Psi_{xx}(i)$ conveniently takes place with every cycle stipulated by the cycle time. For this the measurement value product with the oldest measurement value is subtracted from the sum of measurement value products of the preceding calculation during a current calculation of a function value, and a new measurement value product with the current measurement value is added:

$$\Sigma_{(i,t+1)} = \Sigma_{(i,t)} - x_{(2n-1,t)} \cdot x_{(2n,t)} + x_{(0,t)} \cdot x_{(i,t)}$$

Figure 9:
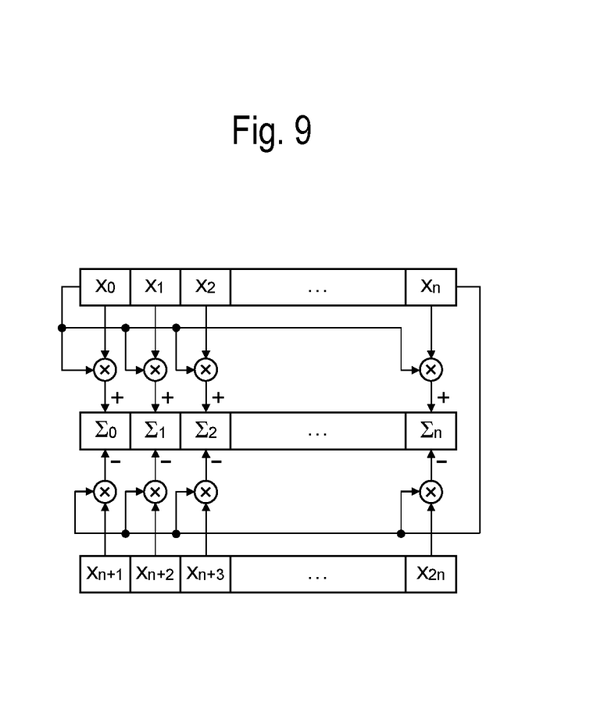

The corresponding summation is demonstrated in FIG. 9. This simplified iterative approach allows the continuous calculation of the auto-correlation function $\Psi_{xx}(i)$ with a limited calculation effort almost in real time.

Further function values are interpolated from the development of the function values $\Psi_i$ during an optimisation step illustrated in the upper diagram of FIG. 8. The result is clear from the lower diagram. As the period duration T to be calculated is determined by the position of the first maximum (with the exception of zero), an interpolation is expediently carried out only for this range. This expected range is generally known from the frequencies stipulated in track construction.

Figure 10:
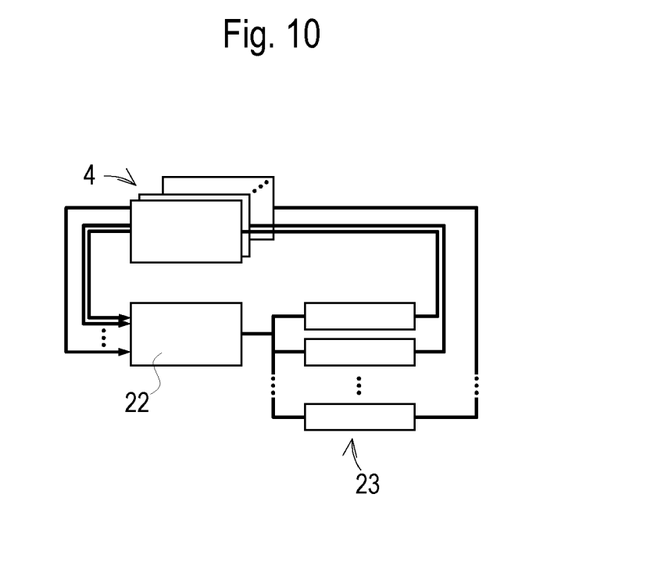

A calculation unit 22 for carrying out the method steps stated is arranged in an evaluation means 21. The measurement values $x_i$ of several vibration generators 12 of a controlled working unit 4 are supplied to the calculation unit 22 in the system illustration in FIG. 10 here. The individual drives 13 of the working unit 4 are controlled via associated performance levels 23 on the output side.

Figure 11:
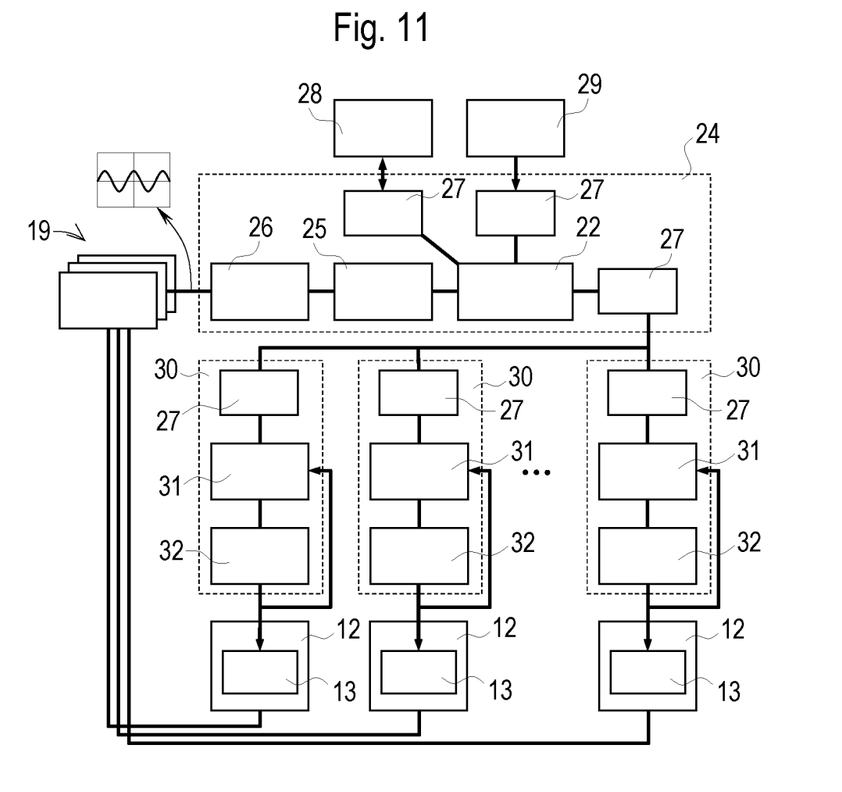

This system construction is illustrated in more detail in FIG. 11. A first assembly 24 comprises the calculation unit 22, an analogue-digital converter 25, a pre-processing unit 26 and communication interfaces 27. Measurement signals of the sensors 19 are prepared for the calculation unit 22 via the pre-processing unit 26 and the analogue-digital converter 25. Time-discrete measurement value series are in fact formed, which represent the respective periodic measurement value development.

The calculation unit 22 is coupled with a configuration and diagnosis unit 28 and a controller 29 via the communication interfaces 27 for the stipulation of general control commands. Dedicated assemblies 30 are also envisaged for each vibration generator 12, which are coupled with the calculation unit 22 via communication interfaces 27. Each one of these assemblies 30 here comprises a regulator unit 31 and power electronics 32 for controlling the associated drive 13.

Figure 12:
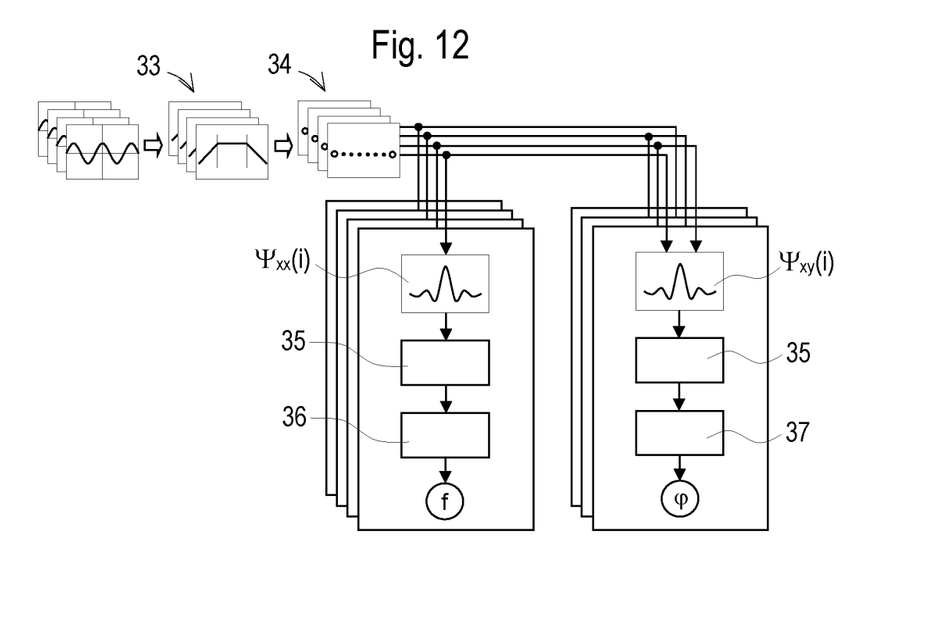

An exemplary processing of the measurement signals or measurement values $x_i$ is illustrated for four controlled/regulated vibration generators 12 of a working unit 4 in FIG. 12. A sensor 19 for generating a periodic development for the corresponding measurement parameter X is allocated to each vibration generator 12. Measurement value series are formed from this with respective filtering 33 and a scanning rate conversion 34.

The auto-correlation function $\Psi_{xx}(i)$ is formed continuously from the measurement value series of a vibration generator 12 for determining the respective current frequency f. A frequency determination 36 by means of an extreme value determination 35 results from this.

A determination of the associated phase offset φ takes place three times parallel to this for two vibration generators 12 each. For this a cross-correlation is first formed from the two measurement value series. The following cross-correlation function results from the measurement values $x_i$ of the one vibration generator 12 and the measurement values $y_i$ of the other vibration generator 12:

$$\Psi_{xy}(i) = \sum_n x_n \cdot y_{n-i}$$

The corresponding phase offset determination 37 is realised by means of an extreme value determination 35 from the respective continuously formed development of the cross-correlation $\Psi_{xy}(i)$.

The invention claimed is:

1. A method for controlling/regulating a rotary drive of a working unit of a track maintenance machine, the method comprising:
   using a sensor to record a measurement parameter with an approximately periodic history function derived from a rotation of the drive;
   determining a frequency or a period duration of the history function by using an evaluation device by
       forming a number of time-discrete measurement values for the measurement parameter, and
       carrying out an auto-correlation of the measurement values by using a calculation unit for determining the frequency or the period duration; and
   comparing the frequency or the period duration with a target parameter for stipulating a control signal for controlling the rotary drive using a controller.

2. The method according to claim 1, which further comprises:
   using a further sensor to record a further measurement parameter with an approximately periodic history function derived from a rotation of a further drive;
   forming a further number of time-discrete measurement values for the further measurement parameter; and
   using the calculation unit to carry out a cross-correlation of the measurement values of both measurement parameters for determining a phase offset.

3. The method according to claim 1, which further comprises stipulating a cycle time for forming the time-discrete measurement values, and using the cycle time to determine an evaluation period.

4. The method according to claim 1, which further comprises providing an iterative calculation of function values of a correlation function by using a summation of a consistent number of measurement value products with every new measurement value.

5. The method according to claim 4, which further comprises subtracting a measurement value product with an oldest measurement value from a sum of measurement value products of a preceding calculation for a current calculation of a function value, and adding a new measurement value product to the current measurement value.

6. The method according to claim 1, which further comprises calculating interpolated measurement values prior to a calculation of function values of a correlation function.

7. The method according to claim 1, which further comprises filtering the measurement values prior to a calculation of function values of a correlation function.

8. The method according to claim 1, which further comprises calculating interpolated function values prior to a determination of a maximum of a correlation function.

9. The method according to claim 1, which further comprises recording a distance from a sensitive element of the sensor to an eccentric shaft driven by the drive, as a measurement parameter.

10. The method according to claim 1, which further comprises recording a field strength of a magnetic field rotated with the drive and acting on the sensor, as a measurement parameter.

11. A device for carrying out a method for controlling/regulating a rotatory drive of a working unit of a track maintenance machine according to claim 1, the device comprising:
    a sensor for recording a measurement parameter with an approximately periodic history function derived from a rotation of a drive;
    an evaluation device for determining a frequency or a period duration of the history function with:
    a calculation unit supplied with time-discrete measurement values of the measurement parameter, said calculation unit containing an algorithm for carrying out an auto-correlation of the measurement values for determining the frequency or the period duration; and
    a controller for regulated control of the drive by comparing the frequency for the period duration with a target parameter for stipulating a control signal.

12. The device according to claim 11, which further comprises:
    a further sensor for recording a further measurement parameter derived from a rotation of a further drive;
    said calculation unit being supplied with time-discrete measurement values of the further measurement parameter; and
    said calculation unit containing an algorithm for carrying out a cross-correlation of the measurement values of both measurement parameters for determining a phase offset.

13. The device according to claim 11, wherein said calculation unit is a microprocessor.

14. The device according to claim 11, which further comprises:
    a first assembly including said calculation unit and a communication interface; and
    a dedicated assembly for the drive, said dedicated assembly coupled with said first assembly, and said dedicated assembly including power electronics, a regulator unit and a communication interface.

15. The device according to claim 11, wherein said sensor includes a sensitive element for a capacitive or inductive or magnetic recording of the measurement parameter.

* * * * *